Jan. 31, 1933.　　　　S. COHEN　　　　1,895,540
VARIABLE CONDENSER
Filed Feb. 9, 1931
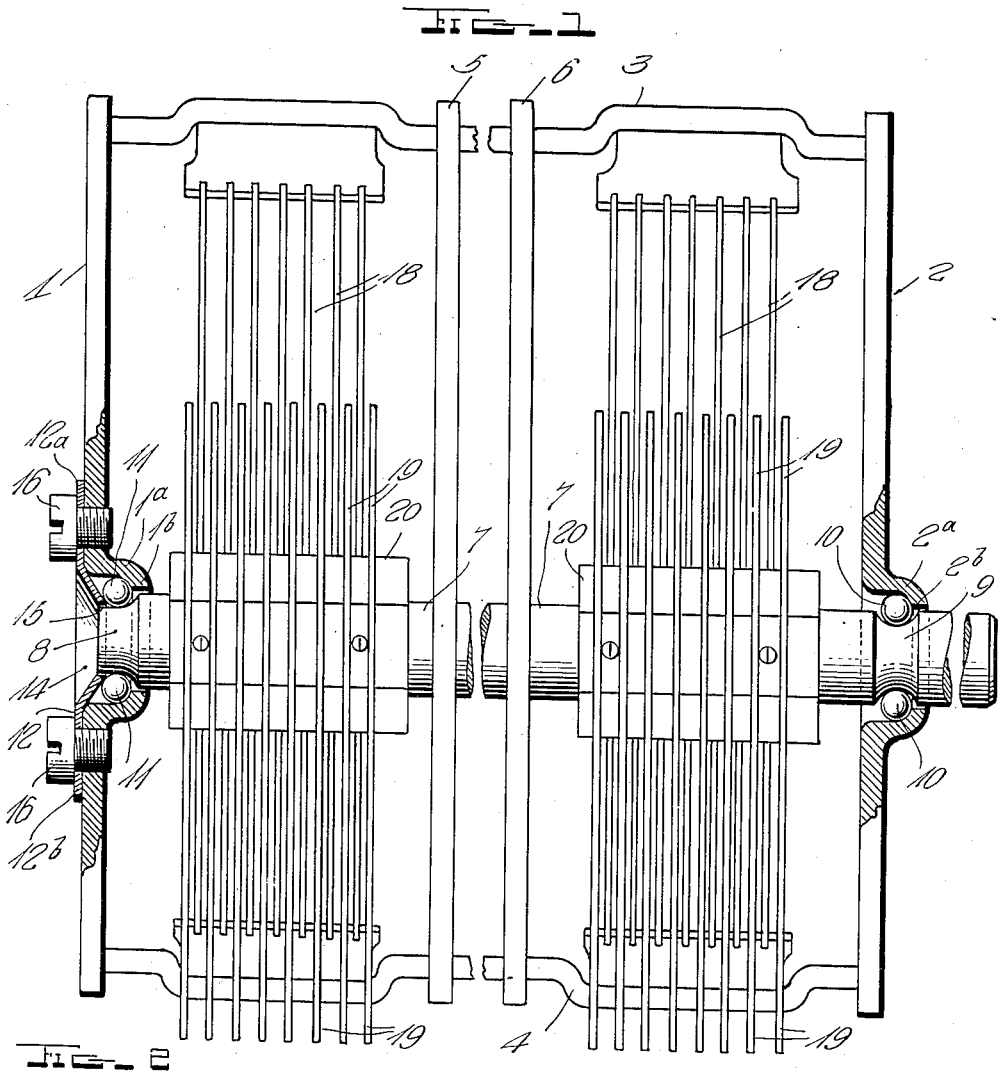
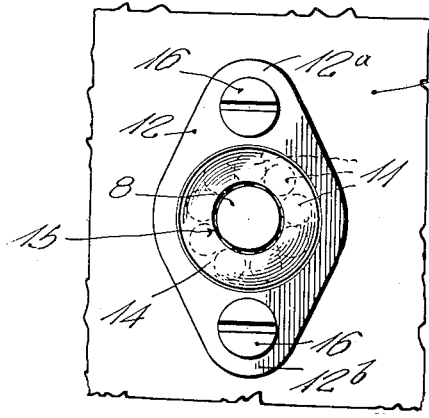
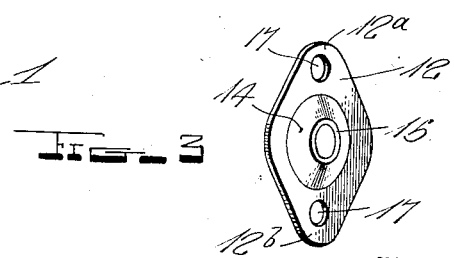
INVENTOR.
Samuel Cohen,
BY John C. Brady
ATTORNEY Patented Jan. 31, 1933

1,895,540

UNITED STATES PATENT OFFICE

SAMUEL COHEN, OF BROOKLYN, NEW YORK, ASSIGNOR TO GENERAL INSTRUMENT CORPORATION, OF NEW YORK, N. Y., A CORPORATION OF NEW YORK

VARIABLE CONDENSER

Application filed February 9, 1931. Serial No. 514,682.

My invention relates broadly to variable condensers and more particularly to means for mounting the rotary shaft of a variable condenser.

One of the objects of my invention is to provide an anti-friction mounting for the rotary shaft of a variable condenser which may be readily assembled in quantity production for accurately maintaining the rotary shaft element of the variable condenser in a position for interleaving sets of rotor plates with sets of stator plates.

Another object of my invention is to provide a construction of anti-friction mounting for the rotary shaft of a variable condenser wherein a pair of ball races are directly pressed into the ends of the condenser chassis and the rotary shaft maintained in position therein floatingly mounted on ball bearings and secured against endwise displacement by means of a conical shaped plate adapted to retain the ball bearings in a predetermined path around the rotary shaft.

Still another object of my invention is to provide a construction of conical shaped plate apertured for the passage of the rotary shaft element of a variable condenser and adapted to be mounted upon the frame of the variable condenser for confining the path of movement of ball bearings around the rotary shaft element.

Other and further objects of my invention reside in the construction of bearing plate for the rotary shaft element of a variable condenser as set forth more fully in the specification hereinafter following by reference to the accompanying drawing, wherein:

Figure 1 is a plan view of a multiple variable condenser constructed in accordance with my invention; Fig. 2 is an elevational view showing the conical shaped bearing plate of my invention in position on one end of the condenser chassis; and Fig. 3 is a perspective view of the bearing plate showing the inwardly projecting conical portion thereon.

My invention is directed to a simplified method of mounting the rotary shaft of a variable condenser in antifriction bearings wherein the rotary shaft which carries the rotor plates of the variable condenser is journaled in the opposite ends of the condenser chassis. Ball races are directly pressed in the end plates of the condenser chassis and the rotary shaft element projected through the ball races thus formed. The rotary shaft element is grooved adjacent each of the ball races, the shaft passing through one of the ball races and into the other of the ball races. Ball bearings are maintained in one of the ball races by the relationship which is established between the balls and the annular groove formed in the rotary shaft element. A plate member is secured to the end of the condenser chassis adjacent the ball race into which the rotary shaft element projects. The plate member is apertured for the passage of the end of the rotary shaft element. The apertured portion of the plate is located at the terminus of the conical shaped indentation which is formed in the plate member. The plate member is secured to the condenser chassis in any desired manner and projects into the ball race and serves to maintain the movement of the ball bearings in a predetermined path.

Referring to the drawing in detail, the condenser chassis is shown comprising end plate portions 1 and 2 interconnected by the side portions 3 and 4. The end portions 1 and 2 of the condenser chassis are pressed to form ball races as shown at 1a and 2a, the ball races being apertured at 1b and 2b to allow shaft 7 to be freely passed therethrough. My invention has been illustrated in connection with a multiple variable condenser including the shield plates 5 and 6 which serve to separate and electrically isolate the condenser sections. Any number of condenser sections may be employed and in order to illustrate my invention, I have foreshortened the condenser frame by breaking away the shaft 7 and the side members 3 and 4 as illustrated. The rotary shaft 7 carries block members 20 in which the rotor plates 19 are mounted in fixed spacial relation and adapted to be interleaved with the sets of stator plates 18 which are suspended laterally of the condenser frame and between the side plates 3 and 4.

The rotary shaft 7 is provided with an annular groove 9 adjacent the ball race 2a in the end portion 2 of the condenser chassis to receive the bearing balls 10. The end of the rotary shaft 7 is tapered as indicated at 8, the shaft projecting into the ball race 1a in the end plate portion 1 of the condenser chassis. The tapered portion 8 is floatingly supported on the ball bearings 11 which roll in a predetermined course around the projecting end of the shaft 7. The end plate or cap 12 is mounted on the end portion 1 of the condenser chassis. The plate member 12 is tapered from the center toward each end thereof as shown at 12a and 12b, the end portion of the plate member being apertured at 17. Screw members 16 pass through the aperture 17 and secure the plate member 12 in position with respect to the end plate 1 of the condenser chassis. The plate member 12 is provided with a central conical offset portion 14 adapted to project into the ball race 1a. The conical shaped portion 14 terminates in an aperture 15 through which the end of the shaft 7 projects forming a closed housing for the ball bearings 11. The portion 14 of the plate 12 is substantially in the shape of a frustum of a cone adapted to bear directly against the ball bearings 11 as the ball bearings move around the interior of the ball race 12. The conical shaped portion 14 of the end plate 12 is resilient and is tensioned against the ball bearings 11. The plate member 12 is formed by a pressing operation by which the conical shaped portion 14 is outstruck to provide a yielding support for one side of the ball race 1a.

Endwise movement of the shaft 7 is eliminated by virtue of the forces which are continuously applied against the tapered end 8 of the shaft 7 by virtue of the resilient action of the conical shaped portion 14 of the plate 12 against the ball bearings 11. This serves to maintain the sets of rotor plates 19 in alignment between the sets of stator plates 18 thereby insuring the permanence of the capacity range of the condenser.

While I have described my invention in one of its preferred embodiments, I desire that it be understood that modifications may be made and that no limitations upon my invention are intended other than are imposed by the scope of the appended claims.

What I claim as new and desire to secure by Letters Patent of the United States is as follows:

1. In a bearing for a variable condenser, a frame including a pair of end plates each having a ball race mounted therein, a rotatable shaft extending through one of said ball races and projecting into and terminating within the other of said ball races, a centering plate having a pair of diametrically opposite lug portions secured to one of the end plates of said condenser frame, said centering plate having a frusto-conical resilient portion projecting into said last mentioned ball race and apertured for encircling the projecting end of said rotatable shaft, the edge of said centering plate lying in the plane of the projecting end of said rotatable shaft, the frusto-conical portion of said centering plate bearing against ball bearings confined within an annular path of movement in the ball race in said last mentioned end plate.

2. In a bearing for a variable condenser, a frame including plates formed with aligned openings and each having a bearing race about its opening, the race of one plate being cup-shaped and open at its outer end, a rotatable shaft extending through said frame and engaged through the openings in the plates with one end terminating in the cup-shaped bearing race and tapered, bearing balls in said races about the shaft and rotatably supporting the same, the balls in the cup-shaped race being inserted through the outer end thereof and engaged about the tapered end of said shaft, and a cap for the outer end of the cup-shaped race removably secured against the outer face of the plate carrying the said race in bridging relation to the race and having a resilient frusto-conical portion extending into the cup-shaped race and engaging the balls therein to retain the balls in place about the tapered end of the shaft and apply pressure to the shaft longitudinally thereof to prevent longitudinal shifting of the shaft.

In testimony whereof I affix my signature.

SAMUEL COHEN.